(12) United States Patent
Higuchi et al.

(10) Patent No.: US 11,072,179 B2
(45) Date of Patent: Jul. 27, 2021

(54) LIQUID ABSORBENT BODY, LIQUID ABSORBER, AND LIQUID TREATMENT APPARATUS

(71) Applicant: SEIKO EPSON CORPORATION, Tokyo (JP)

(72) Inventors: Naotaka Higuchi, Fujimi-machi (JP); Yoichi Miyasaka, Nagano (JP); Shogo Nakada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/899,639

(22) Filed: Jun. 12, 2020

(65) Prior Publication Data

US 2020/0391514 A1     Dec. 17, 2020

(30) Foreign Application Priority Data

Jun. 14, 2019   (JP) .............................. JP2019-110900

(51) Int. Cl.
| | |
|---|---|
| *B41J 2/17* | (2006.01) |
| *B01J 20/28* | (2006.01) |
| *B41J 2/165* | (2006.01) |
| *B41J 2/185* | (2006.01) |

(52) U.S. Cl.
CPC ....... *B41J 2/1721* (2013.01); *B01J 20/28028* (2013.01); *B01J 20/28038* (2013.01); *B41J 2/16523* (2013.01); *B41J 2002/1742* (2013.01); *B41J 2002/1856* (2013.01)

(58) Field of Classification Search
CPC .................. B41J 2/1721; B41J 2/16523; B41J 2002/1742; B41J 2002/1856; B01J 20/28028; B01J 20/28038
See application file for complete search history.

(56) References Cited

U.S. PATENT DOCUMENTS

| | | | |
|---|---|---|---|
| 6,274,522 B1 | 8/2001 | Sameshima et al. | |
| 7,789,482 B2 * | 9/2010 | Ishihara | ................. B41J 2/1721 347/36 |
| 2002/0042237 A1 | 4/2002 | Sameshima et al. | |

FOREIGN PATENT DOCUMENTS

| | | |
|---|---|---|
| JP | 09-158024 A | 6/1997 |
| JP | 2004-065052 A | 3/2004 |
| JP | 2009-274302 A | 11/2009 |
| WO | 2019/187444 A1 | 10/2019 |

* cited by examiner

*Primary Examiner* — Geoffrey S Mruk
(74) *Attorney, Agent, or Firm* — Global IP Counselors, LLP

(57) ABSTRACT

A liquid absorbent body according to the present disclosure includes a water absorbent resin and a pulp fiber, in which an evaporation rate of a pure water until elapse of 360 minutes after the pure water is absorbed is 0.0006 g/(cm²·min) or more and 0.0020 g/(cm²·min) or less, when the pure water of 20 mL is absorbed into the liquid absorbent body of 2.57 g, under an environment of 60° C. and 20% RH. It is preferable that the liquid absorbent body is configured to include an aggregate of small pieces in which a fiber base material containing the pulp fiber carries the water absorbent resin.

7 Claims, 6 Drawing Sheets

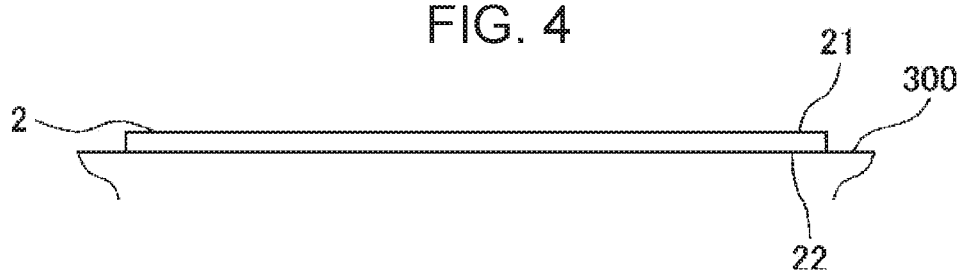
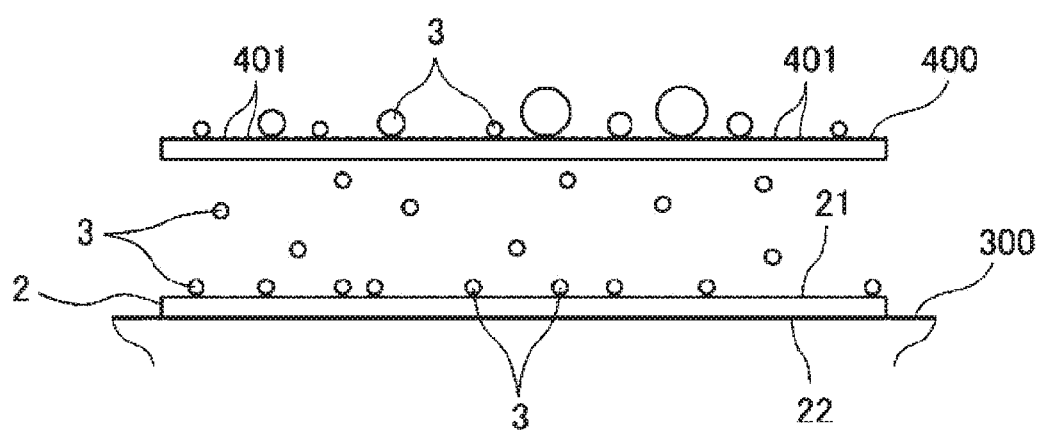
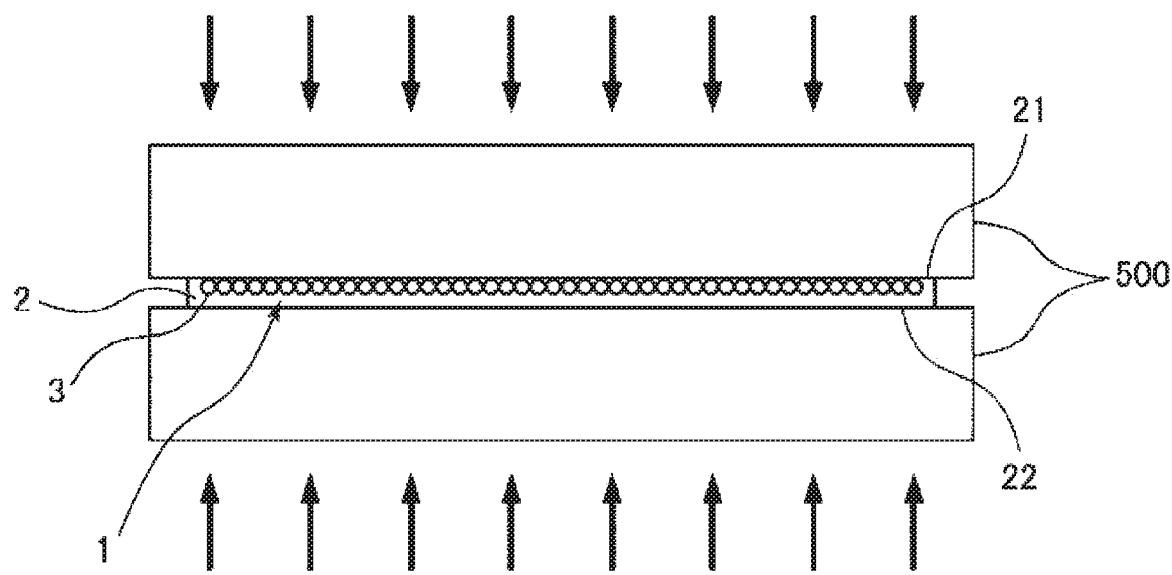

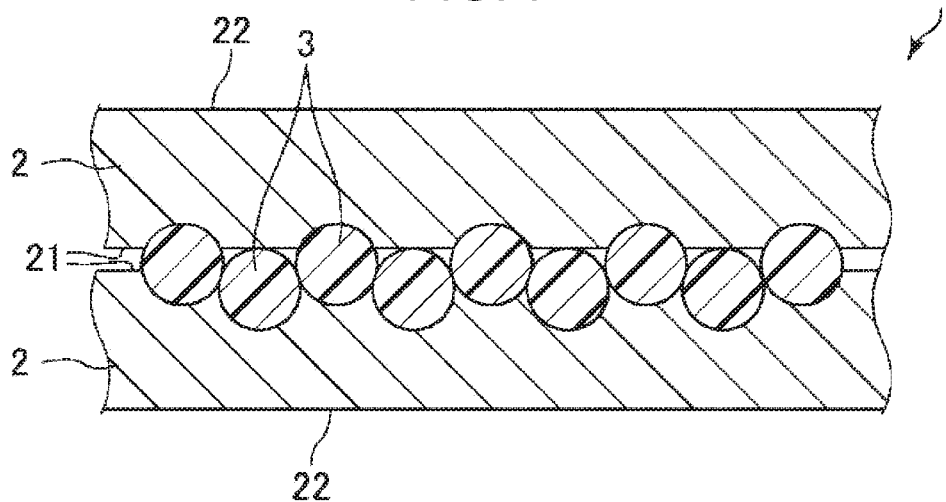
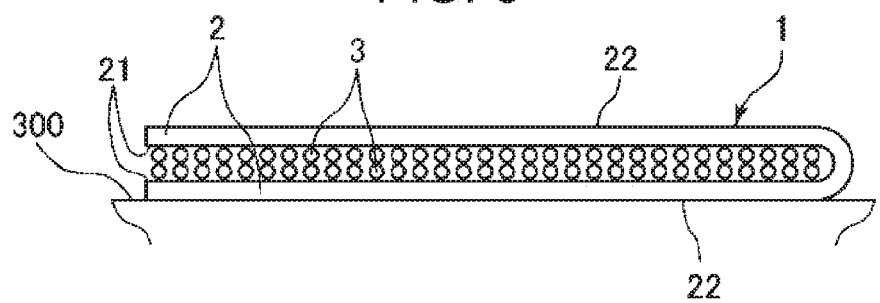
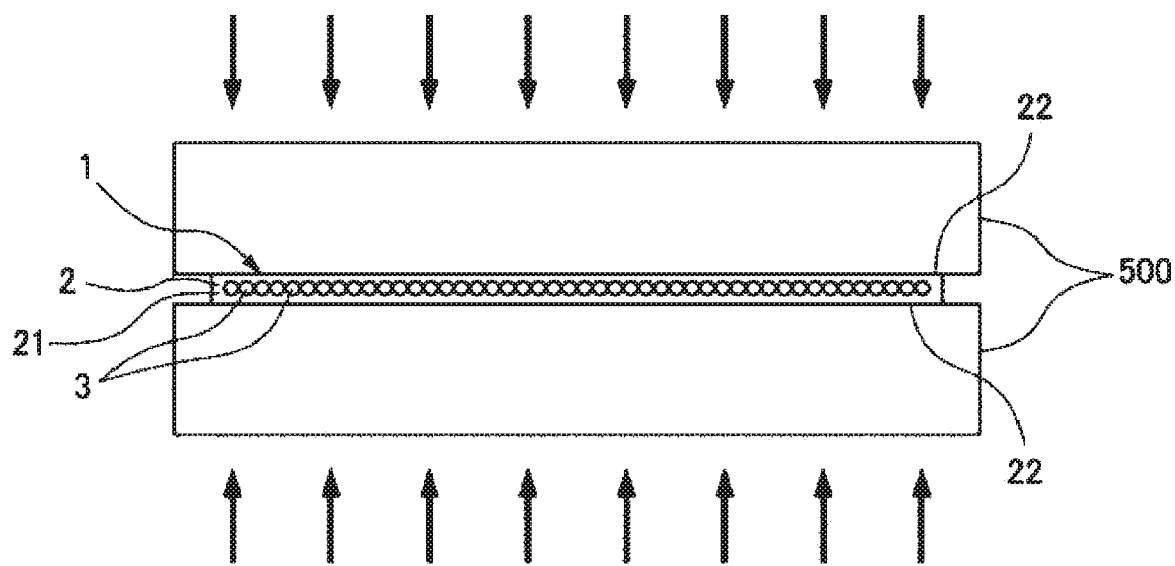

LIQUID ABSORBENT BODY, LIQUID ABSORBER, AND LIQUID TREATMENT APPARATUS

The present application is based on, and claims priority from JP Application Serial Number 2019-110900, filed Jun. 14, 2019, the disclosure of which is hereby incorporated by reference herein in its entirety.

BACKGROUND

1. Technical Field

The present disclosure relates to a liquid absorbent body, a liquid absorber, and a liquid treatment apparatus.

2. Related Art

In the ink jet printer, normally, waste ink is generated during a head cleaning operation performed to prevent a decrease in print quality due to clogging of the ink, or an ink filling operation after replacing an ink cartridge. Therefore, in order to prevent such waste ink from being attached unintentionally to a mechanism or the like inside the printer, a liquid absorbent body that absorbs the waste ink is provided.

In the related art, as a liquid absorbent body, for example, a liquid absorbent body have been used in which a natural cellulose fiber and/or synthetic fiber, a heat-fusible substance, and a thickening substance are mixed and unwoven in air to form a mat, the mat is further heated to a melting point of the heat-fusible substance or higher, and thereafter the thickening substance is fixed in a web by being compressed by a press roll (for example, refer to JP-A-9-158024).

However, the above liquid absorbent body has a problem that even when the initial liquid absorption capacity is high, the liquid absorption capacity is reduced in a relatively short period of time, and the life of the liquid absorbent body is short.

SUMMARY

The present disclosure can be realized in the following application examples.

A liquid absorbent body according to an application example of the present disclosure is a liquid absorbent body including a water absorbent resin and a pulp fiber, in which an evaporation rate of a pure water until elapse of 360 minutes after the pure water is absorbed is 0.0006 g/(cm$^2$·min) or more and 0.0020 g/(cm$^2$·min) or less, when the pure water of 20 mL is absorbed into the liquid absorbent body of 2.57 g, under an environment of 60° C. and 20% RH.

A liquid absorber according to an application example of the present disclosure includes the liquid absorbent body of the present disclosure, and a container that accommodates the liquid absorbent body.

A liquid treatment apparatus according to an application example of the present disclosure includes the liquid absorber of the present disclosure.

BRIEF DESCRIPTION OF THE DRAWINGS

FIG. 4 is a view illustrating a manufacturing step of manufacturing the liquid absorbent body according to the first embodiment, and illustrating a state where a fiber base material is placed on a placement table.

FIG. 5 is a view illustrating a manufacturing step of manufacturing the liquid absorbent body according to the first embodiment, and illustrating a state where a water absorbent resin is applied.

FIG. 6 is a view illustrating a manufacturing step of manufacturing the liquid absorbent body according to the first embodiment, and illustrating a state where a sheet shaped fiber base material is heated and pressed.

FIG. 7 is a cross-sectional view of a small piece provided in a liquid absorbent body according to a second embodiment.

FIG. 8 is a view illustrating a manufacturing step of manufacturing the liquid absorbent body according to the second embodiment, and illustrating a state where a sheet shaped fiber base material is bent after being applied with a water absorbent resin.

FIG. 9 is a view illustrating a manufacturing step of manufacturing the liquid absorbent body according to the second embodiment, and illustrating a state where the sheet shaped fiber base material is heated and pressed.

DESCRIPTION OF EXEMPLARY EMBODIMENTS

Hereinafter, preferred embodiments of the present disclosure will be described in detail.

1. LIQUID ABSORBENT BODY

First, a liquid absorbent body of the present disclosure will be described.

1-1. First Embodiment

Figure 1:
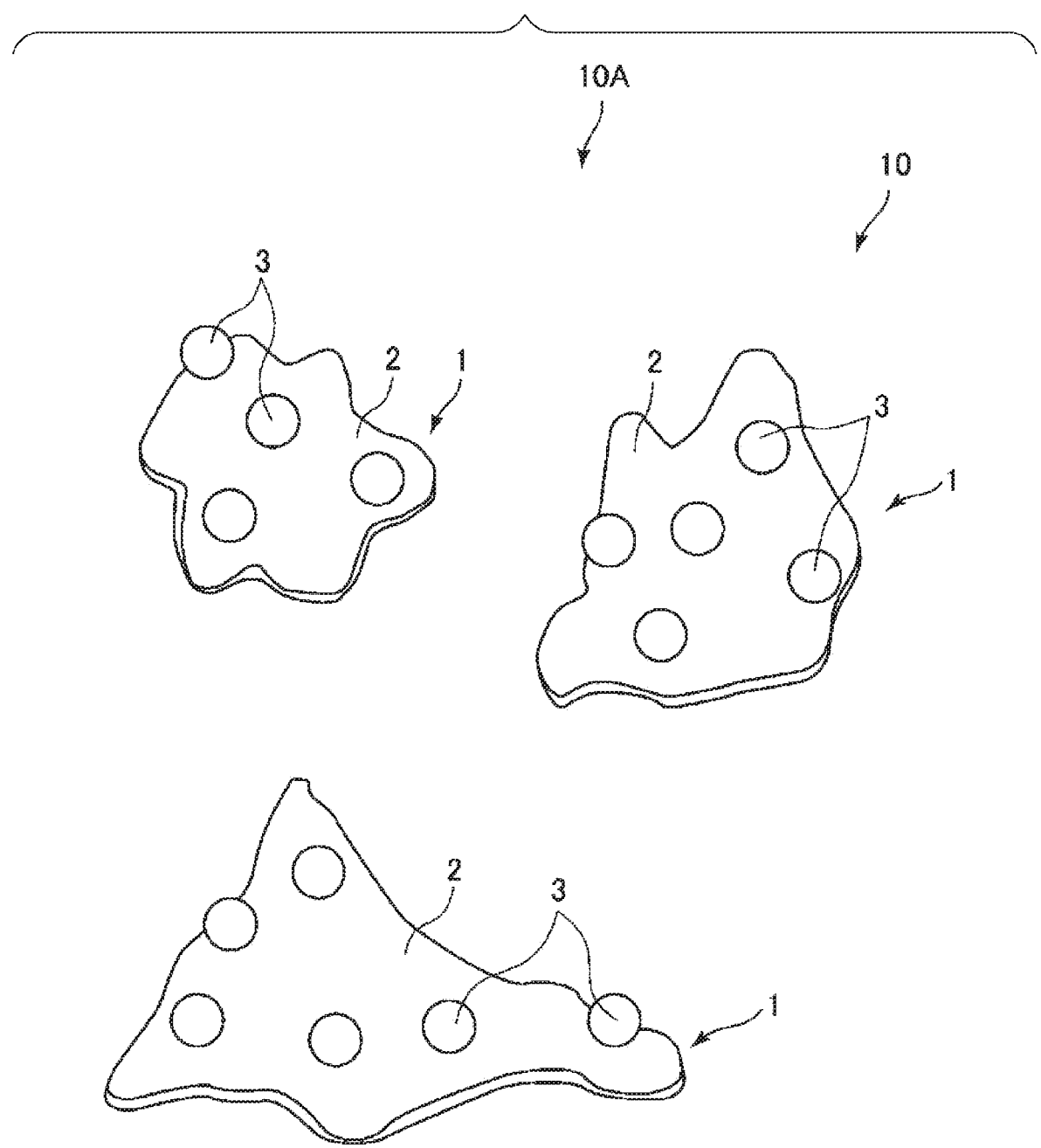
FIG. 1 is a perspective view illustrating a liquid absorbent body according to a first embodiment.
Figure 2:
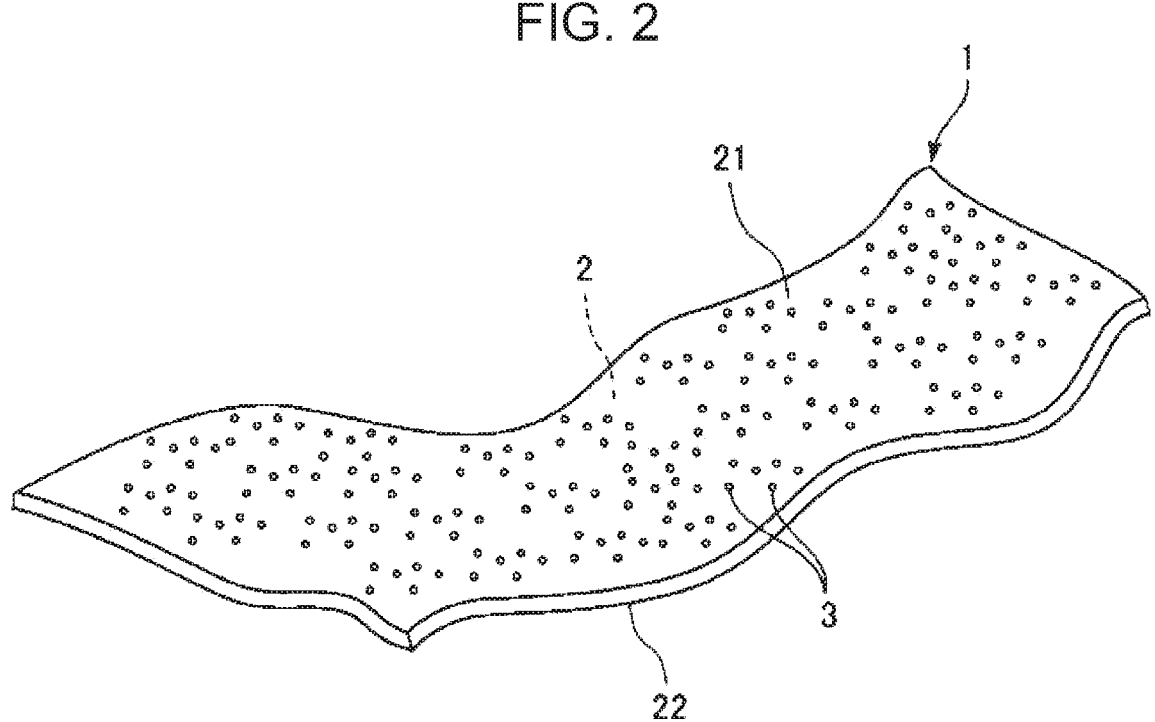
FIG. 2 is a perspective view illustrating an example of a small piece provided in the liquid absorbent body according to the first embodiment.
Figure 3:
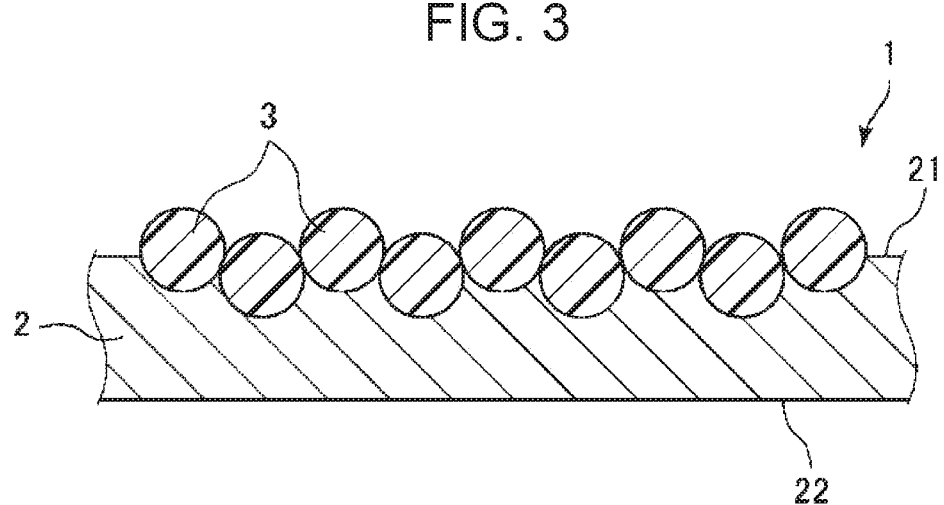
FIG. 3 is a cross-sectional view of the small piece provided in the liquid absorbent body according to the first embodiment.

FIG. 1 is a perspective view illustrating a liquid absorbent body according to a first embodiment. FIG. 2 is a perspective view illustrating an example of a small piece provided in the liquid absorbent body according to the first embodiment. FIG. 3 is a cross-sectional view of a small piece provided in the liquid absorbent body according to the first embodiment. FIG. 4 is a view illustrating a manufacturing step of manufacturing the liquid absorbent body according to the first embodiment, and illustrating a state where a fiber base material is placed on a placement table. FIG. 5 is a view illustrating a manufacturing step of manufacturing the liquid absorbent body according to the first embodiment, and illustrating a state where a water absorbent resin is applied. FIG. 6 is a view illustrating a manufacturing step of manufacturing the liquid absorbent body according to the first embodiment, and illustrating a state where the sheet shaped fiber base material is heated and pressed.

Hereinafter, for convenience of description, upper sides in FIGS. 1 to 6 are referred to as "upper" or "upward", and lower sides are referred to as "lower" or "downward". The same applies to FIGS. 7 to 10 described later.

The liquid absorbent body 10A includes a water absorbent resin 3 and a pulp fiber. An evaporation rate of the pure water until elapse of 360 minutes after the pure water is absorbed is 0.0006 g/(cm$^2$·min) or more and 0.0020 g/(cm$^2$·min) or less, when the pure water of 20 mL is absorbed into the liquid absorbent body 10A of 2.57 g, under an environment of 60° C. and 20% RH.

With such a configuration, it is possible to provide a liquid absorbent body having a high initial liquid absorption capacity and a large lifetime absorption amount of the liquid.

In addition, even when the amount of use of the liquid absorbent body 10A is reduced, the liquid absorption characteristics can be made sufficiently excellent. Therefore, the size of the liquid absorber provided with the liquid absorbent body 10A and the size of the liquid treatment apparatus provided with the liquid absorber can be reduced. In addition, the replacement frequency of the liquid absorbent body 10A can be reduced.

It is considered that such good effects are obtained for the following reasons.

That is, by containing the water absorbent resin and the pulp fiber, when the liquid comes into contact with the liquid absorbent body, the pulp fiber can quickly absorb the liquid due to capillary action and the like, the liquid absorbed by the pulp fiber is transferred to the water absorbent resin, and the fluidity of the liquid is significantly reduced. Therefore, the initial liquid absorption capacity of the entire liquid absorbent body can be increased. As a result, it is possible to preferably prevent the liquid from unintentionally flowing out due to the inversion of the container accommodating the liquid absorbent body.

In addition, since the evaporation rate of the pure water is a value within the range, it is possible to efficiently evaporate the liquid absorbed by the liquid absorbent body while suppressing a solid content contained in the liquid from unevenly precipitating on the front surface of the liquid absorbent body. As a result, the liquid absorbing power of the liquid absorbent body can be suitably restored, and the lifetime absorption amount of the liquid absorbent body can be increased.

As a result, it is considered that the lifetime absorption amount of the liquid can be increased while increasing the initial liquid absorption capacity of the liquid absorbent body.

On the other hand, when the above conditions are not satisfied, the above good effects cannot be obtained.

For example, when the evaporation rate of the pure water is less than the lower limit, the liquid once absorbed by the liquid absorbent body is unlikely to evaporate and continues to be present in the liquid absorbent body, so that the lifetime absorption amount of the liquid for the liquid absorbent body is reduced. In addition, when the evaporation rate of the pure water is less than the lower limit, even when the liquid absorbed by the liquid absorbent body evaporates over a relatively long time, the solid content contained in the liquid is, for example, likely to precipitate on the front surface of the liquid absorbent body in a dense state in the form of a coarse crystal or the like. As a result, even when the amount of water in the liquid absorbent body is reduced, the liquid absorbing power of the liquid absorbent body is significantly reduced, and the lifetime absorption amount of the liquid absorbent body is reduced.

In addition, when the evaporation rate of the pure water exceeds the upper limit, the liquid once absorbed by the liquid absorbent body is easily evaporated, whereas during the evaporation of the liquid, the balance between the evaporation from the front surface of the liquid absorbent body and the transition from the rear portion to the front surface of the liquid absorbent body is lost, and the solid content contained in the liquid is likely to precipitate on the front surface of the liquid absorbent body. As a result, the liquid absorbing power of the liquid absorbent body is significantly reduced, and the lifetime absorption amount of the liquid absorbent body is small.

As described above, the lower limit of the evaporation rate of the pure water may be 0.0006 g/(cm$^2$·min), is preferably 0.0007 g/(cm$^2$·min), more preferably 0.0009 g/(cm$^2$·min), and still more preferably 0.0010 g/(cm$^2$·min). As a result, the above-described effects are more remarkably exhibited.

In addition, the upper limit of the evaporation rate of the pure water may be 0.0020 g/(cm$^2$·min), is preferably 0.0018 g/(cm$^2$·min), more preferably 0.0016 g/(cm$^2$·min), and still more preferably 0.0015 g/(cm$^2$·min). As a result, the above-described effects are more remarkably exhibited.

As described above, the evaporation rate of the pure water is a value obtained as the evaporation rate until elapse of 360 minutes after the absorption of the pure water when the pure water of 20 mL is absorbed into the liquid absorbent body of 2.57 g under the environment of 60° C. and 20% RH, and can be measured more specifically as follows.

That is, first, a liquid absorbent body of 2.57 g, and pure water of 20 mL are put into a New Dispo cup (manufactured by AS ONE Corporation), which is a polypropylene container having a container opening area of 0.0028 m$^2$, an average container inner diameter of 60 mm, and a capacity of 200 mL, and vibrated by an AS200 digit, electromagnetic sieve shaker manufactured by Retsch GmbH, under the condition of amplitude 2.4 mm×1 minute.

Thereafter, the container containing the liquid absorbent body and the pure water is allowed to stand for 360 minutes under an environment adjusted to 60° C. and 20% RH. The environment in which the container containing the liquid absorbent body and the pure water is allowed to stand includes, for example, a constant temperature and humidity chamber.

Thereafter, the mass of the container immediately after the vibration and the mass after standing for 360 minutes are compared, and the evaporation amount of pure water is determined from the mass loss amount. The evaporation rate of pure water is calculated from the determined evaporation amount.

In the present embodiment, as illustrated in FIGS. 1 to 3, the liquid absorbent body 10A is configured to include a small piece aggregate 10 including a plurality of small pieces 1 having the pulp fiber and the water absorbent resin 3.

As a result, as compared with a block-shaped liquid absorbent body, when the liquid is applied, more chances of contact with the liquid can be secured. In addition, the pulp fiber temporarily holds the liquid in a state where a large contact area with the liquid can be secured, and thereafter the liquid can be efficiently sent from the pulp fiber to the water absorbent resin 3. The liquid absorption characteristics of the entire small piece aggregate 10 can be improved.

In addition, since the liquid absorbent body 10A is configured to include the small piece aggregate 10 provided with the plurality of small pieces 1, the shape can be freely changed. Therefore, a desired amount can be suitably stored in the container. As a result, the occurrence of unevenness in the absorption characteristics of the liquid can be more effectively prevented.

Hereinafter, a configuration of the small piece 1 constituting the liquid absorbent body 10A will be described.

In the present embodiment, the small piece 1 has a structure in which a fiber base material 2 containing the pulp fiber carries the water absorbent resin 3. More specifically, the liquid absorbent body 10A is configured to include the small piece aggregate 10 which is an aggregate of the small pieces 1 in which the fiber base material 2 containing the pulp fiber carries the water absorbent resin 3.

As a result, the pulp fiber temporarily holds the liquid in a state where a large contact area with the liquid can be secured, and thereafter the liquid can be efficiently sent from the pulp fiber to the water absorbent resin 3. The liquid absorption characteristics of the entire liquid absorbent body 10A can be improved.

In the present specification, "water absorption" refers to absorbing water itself or a liquid containing water such as ink or body fluids. In addition, in the present specification, "liquid" refers to a liquid containing a solid content in addition to water, such as ink and body fluid, unless otherwise specified. In particular, examples of a preferable liquid include a liquid containing water at a content of 50% by mass or more.

It is preferable that each small piece 1 has flexibility and has a longitudinal shape. Here, the longitudinal shape refers to as a shape having an aspect ratio of 1.5 or more, and corresponds to a so-called strip shape, a shredder piece, or the like.

Each of the small pieces 1 having such a shape is easily deformed. In particular, when the liquid absorbent body 10A is stored in the container, each of the small pieces 1 is deformed regardless of the shape of the inside of the container, that is, the shape followability is more effectively exhibited. Therefore, the liquid absorbent body 10A is stored in a lump without difficulty. In addition, the contact area of the liquid absorbent body 10A as a whole with the liquid can be ensured as much as possible, and therefore, the absorption characteristics for absorbing the liquid are improved.

The small piece 1 constituting the liquid absorbent body 10A may have a curved shape, a bent shape, a twisted shape, or a spiral shape. In addition, the small piece 1 may have a combination thereof. That is, the small piece 1 preferably has at least one of a curved portion, a bent portion, and a twisted portion. As a result, water retention and permeability of the liquid absorbent body 10A can be further improved. As a result, the above-described absorption characteristics can be further improved.

The small piece 1 has a fiber base material 2 containing pulp fibers, and a water absorbent resin 3 carried on at least one surface side of the fiber base material 2.

Since the water absorbent resin 3 is carried on at least one surface side of the fiber base material 2, the liquid reaching a surface of the fiber base material 2 on which the water absorbent resin 3 is carried, in particular, a surface 21 on a front side in the configuration illustrated in FIG. 3, can be absorbed, and the liquid reaching an opposite surface 22 on a rear side can be rapidly propagated and permeated.

In the illustrated configuration, although the water absorbent resin 3 is carried only on one surface side of the fiber base material 2, the water absorbent resin 3 may be carried on both sides of the fiber base material 2, that is, on the surface 21 on the front side and on the surface 22 on the rear side. In this case, it is preferable that the adhesion amount of the water absorbent resin 3 differs between the surface 21 on the front side and the surface 22 on the rear side. As a result, the absorption and propagation of the liquid can be adjusted more suitably.

1-1-1. Fiber Base Material

The fiber base material 2 contains pulp fibers and is a support body that carries the water absorbent resin 3 on the surface. The water absorbent resin 3 can be suitably carried on the fiber base material 2, and the detachment of the water absorbent resin 3 from the fiber base material 2 can be more suitably prevented. In addition, when the liquid is applied to the small piece 1, the fiber base material 2 temporarily holds the liquid, and thereafter the water absorbent resin 3 can be efficiently fed, and the absorption characteristics of the liquid of the entire small piece 1 can be improved. In addition, in general, pulp fibers are inexpensive than the water absorbent resin 3 and are also advantageous from the viewpoint of reducing the production cost of the small piece 1. In particular, when fibers derived from a waste paper are used as the pulp fibers, the above effects are more significantly exhibited. In addition, it is also advantageous from the viewpoint of waste reduction and effective use of resources.

The pulp fibers are mainly formed of cellulose. Since cellulose is a material having a suitable hydrophilic property, when a liquid is applied to the small piece 1, the liquid can be suitably taken in, a state of a particularly high fluidity, for example, of a viscosity of 10 mPa·s or less can be rapidly released, and the liquid once taken in can be suitably fed into the water absorbent resin 3. As a result, it is possible to make the absorption characteristics of the liquid of the entire small piece 1 particularly excellent. In addition, since cellulose has normally a high affinity to the water absorbent resin 3, the water absorbent resin 3 can be more suitably carried on the surface of the pulp fiber. In addition, the pulp fiber is a renewable natural material, and among various types of fibers, it is inexpensive and easily available, so that it is also advantageous from the viewpoints of reduction of production cost of small piece 1, stable production, reduction of environmental load, and the like.

In the present specification, the pulp fiber may be a fibrous material containing cellulose as a main component as a compound, and may include hemicellulose and lignin in addition to cellulose.

The lower limit of the average length of the pulp fibers is not particularly limited, and is preferably 0.1 mm.

The upper limit of the average length of the pulp fibers is not particularly limited, is preferably 7 mm, more preferably 5 mm, and still more preferably 3 mm.

The lower limit of the average width of the pulp fibers is not particularly limited, is preferably 0.005 mm, and more preferably 0.01 mm.

The upper limit of the average width of the pulp fibers is not particularly limited, is preferably 2 mm, and more preferably 1 mm.

The average aspect ratio, that is, the lower limit of a ratio of average length to average width of the pulp fibers is not particularly limited, is preferably 10, and more preferably 15.

The upper limit of the average aspect ratio of the pulp fibers is not particularly limited, is preferably 1,000, and more preferably 500.

According to the above numerical range, it is possible to more suitably carry the water absorbent resin 3, hold the liquid by the pulp fibers, and feed the liquid into the water absorbent resin 3, and it is possible to make the absorption characteristics of the liquid of the entire small piece 1 more excellent.

1-1-2. Water Absorbent Resin

The water absorbent resin 3 which is a component of the liquid absorbent body 10A may be any resin having a water absorbency and is not particularly limited. Examples thereof include carboxymethyl cellulose, polyacrylic acid, polyacrylamide, starch-acrylic acid graft copolymer, hydrolyzate of starch-acrylonitrile graft copolymer, vinyl acetate-acrylic ester copolymer, copolymer of isobutylene and maleic acid, hydrolyzate of acrylonitrile copolymer or acrylamide copolymer, polyethylene oxide, polysulfonic acid compound, polyglutamic acid, salts thereof, crosslinked products thereof, and the like. Here, the water absorbency refers to the function of having hydrophilicity and holding water. Many of the water absorbent resins 3 gel when absorbed by water.

Among these, the water absorbent resin 3 is preferably a resin having a functional group in the side chain. Examples of the functional group include an acid group, a hydroxyl group, an epoxy group, an amino group, and the like.

In particular, the water absorbent resin 3 is preferably a resin having an acid group in the side chain, and more preferably a resin having a carboxyl group in the side chain.

Examples of the carboxyl group-containing unit constituting the water absorbent resin 3 include acrylic acid, methacrylic acid, itaconic acid, maleic acid, crotonic acid, fumaric acid, sorbic acid, cinnamic acid, and those derived from monomers such as anhydrides and salts thereof.

When the liquid absorbent body 10A includes the water absorbent resin 3 having an acid group in the side chain, the lower limit of the proportion of acid groups contained in the water absorbent resin 3 which are neutralized to form a salt is preferably 30 mol %, more preferably 50 mol %, still more preferably 60 mol %, and most preferably 70 mol %.

When the liquid absorbent body 10A includes the water absorbent resin 3 having an acid group in the side chain, the upper limit of the proportion of acid groups contained in the water absorbent resin 3 which are neutralized to form a salt is preferably 100 mol %, more preferably 95 mol %, still more preferably 90 mol %, and most preferably 80 mol %.

As a result, a liquid absorbing property by the liquid absorbent body 10A can be made more excellent.

The type of the salt for neutralization is not particularly limited, examples thereof include alkali metal salts such as sodium salts, potassium salts and lithium salts, salts of nitrogen-containing basic substances such as ammonia, and the like, and sodium salts are preferable.

As a result, a liquid absorbing property by the liquid absorbent body 10A can be made more excellent.

The water absorbent resin 3 having an acid group in the side chain is preferable because electrostatic repulsion between the acid groups occurs at the time of liquid absorption, and an absorption rate is fast. In addition, when the acid group is neutralized, the liquid is likely to be absorbed inside the water absorbent resin due to osmotic pressure.

The water absorbent resin 3 may have a structural unit not containing an acid group, and examples of the structural unit include a hydrophilic structural unit, a hydrophobic structural unit, and structural unit containing a polymerizable crosslinking agent, and the like.

Examples of the hydrophilic structural unit include structural units derived from nonionic compounds such as acrylamide, methacrylamide, N-ethyl (meth) acrylamide, N-n-propyl (meth) acrylamide, N-isopropyl (meth) acrylamide, N, N-dimethyl (meth) acrylamide, 2-hydroxyethyl (meth) acrylate, 2-hydroxypropyl (meth) acrylate, methoxypolyethylene glycol (meth) acrylate, polyethylene glycol mono (meth) acrylate, N-vinyl pyrrolidone, N-acryloyl piperidine, and N-acryloyl pyrrolidine.

Examples of the hydrophobic structural unit include structural units derived from compounds such as (meth) acrylonitrile, styrene, vinyl chloride, butadiene, isobutene, ethylene, propylene, stearyl (meth) acrylate, and lauryl (meth) acrylate.

Examples of the structural unit to be the polymerizable crosslinking agent include structural units derived from diethylene glycol diacrylate, N, N'-methylene bisacrylamide, polyethylene glycol diacrylate, polypropylene glycol diacrylate, trimethylolpropane diallyl ether, trimethylolpropane triacrylate, allyl glycidyl ether, pentaerythritol triallyl ether, pentaerythritol diacrylate monostearate, bisphenol diacrylate, isocyanuric acid diacrylate, tetraallyloxyethane, and diallyloxyacetate.

As the water absorbent resin 3, a polyacrylate copolymer or a polyacrylic acid polymer crosslinked product is preferable from the viewpoint of absorption characteristics, cost and the like.

As a polyacrylic acid polymerization crosslinked product, the proportion of a structural unit having a carboxyl group in the total structural units constituting a molecular chain is preferably 50 mol % or more, more preferably 80 mol % or more, and still more preferably 90 mol % or more.

When the proportion of the structural unit containing a carboxyl group is too low, it may be difficult to make the absorption characteristics of the liquid sufficiently excellent.

The carboxyl group in the polyacrylic acid polymerization crosslinked product is preferably partially neutralized to form a salt.

The lower limit of the proportion of neutralized ones in the total carboxyl groups in the polyacrylic acid polymer crosslinked product is preferably 30 mol %, more preferably 50 mol %, and still more preferably 70 mol %.

It is preferable that the upper limit of the proportion of neutralized ones in all carboxyl groups in the crosslinked polyacrylic acid polymer is 99 mol %.

In addition, the water absorbent resin 3 may have a structure crosslinked by a crosslinking agent other than the above-described polymerizable crosslinking agent.

When the water absorbent resin 3 is a resin having an acid group, for example, a compound having a plurality of functional groups reactive with the acid group can be preferably used as the crosslinking agent.

When the water absorbent resin 3 is a resin having a functional group reactive with the acid group, a compound having a plurality of functional groups reactive with the acid group in the molecule can be suitably used as the crosslinking agent.

Examples of the crosslinking agent which is a compound having the plurality of functional groups reactive with the acid group include glycidyl ether compounds such as ethylene glycol diglycidyl ether, trimethylolpropane triglycidyl ether, (poly) glycerin polyglycidyl ether, diglycerin polyglycidyl ether, and propylene glycol diglycidyl ether; polyhydric alcohols such as (poly) glycerin, (poly) ethylene glycol, propylene glycol, 1,3-propanediol, polyoxyethylene glycol, triethylene glycol, tetraethylene glycol, diethanolamine, and triethanolamine; polyvalent amines such as ethylenediamine, diethylenediamine, polyethyleneimine, and hexamethylenediamine. In addition, polyvalent ions such as zinc, calcium, magnesium, and aluminum can be suitably used because these react with the acid groups of the water absorbent resin 3 to function as a crosslinking agent.

The water absorbent resin 3 may have any shape, for example, scaly, acicular, fibrous, or particulate shape, and the majority thereof is preferably in the form of particles. When the water absorbent resin 3 is in the form of particles, the permeability of the liquid can be easily ensured. In addition, the water absorbent resin 3 can be suitably carried on the fiber base material 2. The particulate shape refers to the ratio of the maximum length to the minimum length is 0.7 or more and 1.0 or less.

The lower limit of the average particle diameter of the particles is preferably 10 µm, more preferably 20 µm, and still more preferably 30 µm.

The upper limit of the average particle diameter of the particles is preferably 800 µm, more preferably 600 µm, and still more preferably 500 µm.

As a result, the effects as described above can be more reliably exhibited.

On the other hand, when the average particle diameter of the particles is too small, the permeability of the liquid to the inside of the liquid absorbent body 10A is likely to be reduced.

In addition, when the average particle diameter of the particles is too large, a specific surface area of the water absorbent resin 3 is small, the absorption characteristics of the liquid decrease, and the absorption rate of the liquid decreases.

In the present disclosure, the average particle diameter refers to a volume-based average particle diameter. The average particle diameter can be determined, for example, by measurement with a particle diameter distribution measuring device having a laser diffraction and scattering method as a measurement principle, that is, a laser diffraction type particle diameter distribution measuring device.

In addition, in a case in which the water absorbent resin 3 is in the form of particles, when the average particle diameter of the water absorbent resin 3 is D [µm] and the average length of the pulp fiber is L [µm], it is preferable to satisfy the relationship of $0.15 \leq L/D \leq 467$, more preferable to satisfy the relationship of $0.25 \leq L/D \leq 333$, and still more preferable to satisfy the relationship of $2 \leq L/D \leq 200$.

As a result, it is possible to more suitably carry the water absorbent resin 3, hold the liquid by the pulp fibers, and feed the liquid into the water absorbent resin 3, and it is possible to make the absorption characteristics of the liquid of the entire liquid absorbent body 10A more excellent.

The particles may contain components other than the water absorbent resin. Examples of such components include surfactants, lubricants, antifoaming agents, fillers, anti-blocking agents, ultraviolet absorbing agents, and the like.

The water absorbent resin 3 may have a uniform structure as a whole, or may have a different structure at each portion. For example, in the water absorbent resin 3, the area near the surface, more specifically, for example, the area with a thickness of 1 µm from the surface may have a higher degree of cross-linking than that of other portion.

As a result, it is possible to improve an absorption ratio and an absorption rate of the liquid, strength of the water absorbent resin 3, and the like in a more balanced manner.

In addition, the adhesion between the water absorbent resin 3 and the pulp fibers can be made more excellent, the liquid once held by the pulp fibers can be fed efficiently by the water absorbent resin, and the absorption characteristics of the entire liquid absorbent body 10A can be further improved.

In addition, as illustrated in FIG. 3, the water absorbent resin 3 is carried on one surface side of the fiber base material 2. In addition, a portion of the water absorbent resin 3 is penetrated inward from one surface of the fiber base material 2. That is, a portion of the water absorbent resin 3 is impregnated in the fiber base material 2. As a result, the carrying capacity of the water absorbent resin 3 to the fiber base material 2 can be enhanced. Therefore, the water absorbent resin 3 can be prevented from detaching in the container 7. As a result, the high absorption characteristics of the liquid can be exhibited over a long period of time, the water absorbent resin 3 can be prevented from being unevenly distributed in the container 7, and the occurrence of unevenness in the absorption characteristics of the liquid can be prevented.

In the present specification, "impregnation" refers to a state of being embedded in which at least a portion of the particles of the water absorbent resin 3 penetrates inward from the surface of the fiber base material 2. In addition, it is not necessary for all particles to be impregnated. In addition, a state where the particles of the water absorbent resin 3 penetrate in the inside of the fiber base material 2 by softening and come out to the rear surface of the fiber base material 2 is also included.

The lower limit of the ratio of the content of the water absorbent resin 3 to the content of the pulp fibers in the small pieces 1 is preferably 10% by mass, and more preferably 20% by mass.

The upper limit of the ratio of the content of the water absorbent resin 3 to the content of the pulp fibers in the small piece 1 is preferably 300% by mass, and more preferably 150% by mass.

As a result, the water absorbency and permeability can be sufficiently ensured.

When the content of the water absorbent resin 3 in the small pieces 1 is too low, the water absorbency may be insufficient. On the other hand, when the content of the water absorbent resin 3 in the small piece 1 is too high, there is a possibility that the expansion coefficient of the small piece 1 tends to increase, and the permeability may be reduced.

In addition, the small pieces 1 may contain components other than those described above.

Examples of such components include surfactants, lubricants, antifoaming agents, fillers, anti-blocking agents, ultraviolet absorbing agents, colorants such as pigments and dyes, flame retardants, flow improvers, and the like.

The content of the other components in the small piece 1 is preferably 10% by mass or less, and more preferably 5.0% by mass or less.

The preferred range of the length in the longitudinal direction of the small piece 1 is not particularly limited, and depends on the shape and size of the container. The lower limit of the average value of the length in the longitudinal direction of the small piece 1 is preferably 0.5 mm, more preferably 1.0 mm, and still more preferably 2.0 mm. The upper limit of the average value of the length in the longitudinal direction of the small piece 1 is preferably 200 mm, more preferably 100 mm, and still more preferably 30 mm.

As a result, it is possible to more suitably carry the water absorbent resin 3, hold the liquid by the pulp fibers, and feed the liquid into the water absorbent resin 3, and it is possible to make the absorption characteristics of the liquid of the entire small piece 1 more excellent.

In addition, the preferred range of the width of the small piece 1 is not particularly limited, and depends on the shape and size of the container. The lower limit of the average value of the width of the small pieces 1 is preferably 0.1 mm, more preferably 0.3 mm, and still more preferably 1 mm.

The upper limit of the average value of the width of the small pieces 1 is preferably 100 mm, more preferably 50 mm, and still more preferably 20 mm.

In addition, the lower limit of the average value of the aspect ratio, which is the ratio of the length to the width for each small piece 1, is preferably 2.0, and more preferably 2.5. The upper limit of the average value of the average aspect ratio, which is the ratio of the length to the width for each small piece 1, is preferably 200, and more preferably 30.

The lower limit of the thickness of the small piece 1 is preferably 0.05 mm, and more preferably 0.1 mm. The upper limit of the thickness of the small piece 1 is preferably 2 mm, and more preferably 1 mm.

According to the above numerical range, it is possible to more suitably carry the water absorbent resin 3, hold the liquid by the pulp fibers, and feed the liquid into the water absorbent resin 3, and it is possible to make the absorption characteristics of the liquid of the entire small piece 1 more excellent. Furthermore, the entire liquid absorbent body 10A is likely to be deformed, and the shape followability to the container is excellent.

The liquid absorbent body 10A may include small pieces 1 having different sizes and shapes.

In addition, the liquid absorbent body 10A may include small pieces 1 in which at least one of the length, width, aspect ratio, and thickness are the same as each other, or may include different small pieces 1 of all of these.

The lower limit of the content of the small pieces 1 having a maximum width of 3 mm or less in the liquid absorbent body 10A is preferably 30% by mass, and more preferably 40% by mass. The upper limit of the content of the small pieces 1 having a maximum width of 3 mm or less in the liquid absorbent body 10A is preferably 90% by mass, and more preferably 80% by mass. As a result, the occurrence of unevenness in the absorption characteristics of the liquid can be more effectively prevented.

If the content of the small piece 1 having a maximum width of 3 mm or less is too low, when the liquid absorbent body 10A is stored in the container, a gap is likely to be formed between the small pieces 1 and there is a concern that unevenness occurs in the absorption characteristics of the liquid in the container. On the other hand, when the content of the small piece 1 having a maximum width of 3 mm or less is too high, it tends to be unlikely to form a gap between the small pieces 1.

In addition, although the small piece 1 may have an irregular shape when the small piece 1 is made planar by correcting curve or bending, it is preferable that the small piece 1 has a regular shape. Specifically, it is preferable that the small piece 1 is cut into a regular shape by a shredder or the like. As a result, unintended unevenness in the absorption characteristics of the liquid can be prevented in the container. In addition, the small piece 1 cut into a regular shape can reduce the area of the cut surface as much as possible. Therefore, it is possible to suppress dust generation due to scattering of pulp fibers and the water absorbent resin 3 while ensuring appropriate absorption characteristics of the liquid.

In the present specification, the "regular shape" refers to, for example, a shape such as a rectangle, a square, a triangle, a polygon such as a pentagon, a circle, an ellipse or the like. In addition, each of the small pieces 1 may have the same size or a similar shape. In addition, for example, in the case of the rectangle, even when the lengths of the sides are different from each other, if it is a category of the rectangle, it has the regular shape.

In addition, in the present specification, the "irregular shape" refers to a shape other than the "regular shape" as described above, such as a shape roughly cut or torn by hand.

The content of the small pieces 1 having regular shapes when the small pieces 1 are made planar by correcting curve and bending as described above is preferably 30% by mass or more, more preferably 50% by mass or more, and still more preferably 70% by mass or more of the entire liquid absorbent body 10A.

As described above, each of the small pieces 1 has an elongated shape, that is, has a longitudinal direction. The container is filled so that the extension directions of each of the small pieces 1 differ from each other. That is, the plurality of small pieces 1 are stored in the container as an aggregate without regularity so that the extension directions of the small pieces 1 intersect with each other without being aligned. Furthermore, in other words, each of the small pieces 1 is stored at random in a two-dimensional direction or a three-dimensional direction in the container.

In such a stored state, a gap is likely to be formed between the small pieces 1. As a result, the liquid can pass through the gap, and if the gap is too small, the liquid can wet and spread by capillary phenomenon, that is, the permeability of the liquid can be ensured. As a result, the liquid flowing downward in the container is prevented from being blocked in the middle, and thus can permeate into the bottom portion of the container. As a result, each of the small pieces 1 can suitably absorb the liquid and hold the liquid for a long period of time.

In addition, the shape of the small piece aggregate 10 can be freely changed. Therefore, the liquid absorbent body 10A can be appropriately stored in a container in a desired amount, and it is possible to effectively prevent unevenness in the liquid absorption characteristics at each portion in the container.

In addition, since each of the small pieces 1 is stored at random, the entire liquid absorbent body 10A has an increased chance of contacting the liquid, and thus the absorption performance absorbing the liquid is improved. In addition, when the liquid absorbent body 10A is stored in the container, each of the small pieces 1 can be randomly put into the container, and thus the storing operation can be performed easily and rapidly.

In the liquid absorbent body 10A, a wind speed as an index of air permeability determined as follows is preferably 8 m/s or more and 25 m/s or less, more preferably 9 m/s or more and 23 m/s or less, and still more preferably 10 m/s or more and 21 m/s or less.

As a result, the air permeability of the liquid absorbent body 10A can be made more excellent, and for example, in addition to the air permeability in the gap between the small pieces 1, the liquid permeability can be made more excellent. As a result, the liquid absorption characteristics of the liquid absorbent body 10A and the ease of evaporation of the liquid absorbed by the liquid absorbent body 10A can be made more excellent. Therefore, the lifetime absorption amount of the liquid can be further increased.

Figure 11:
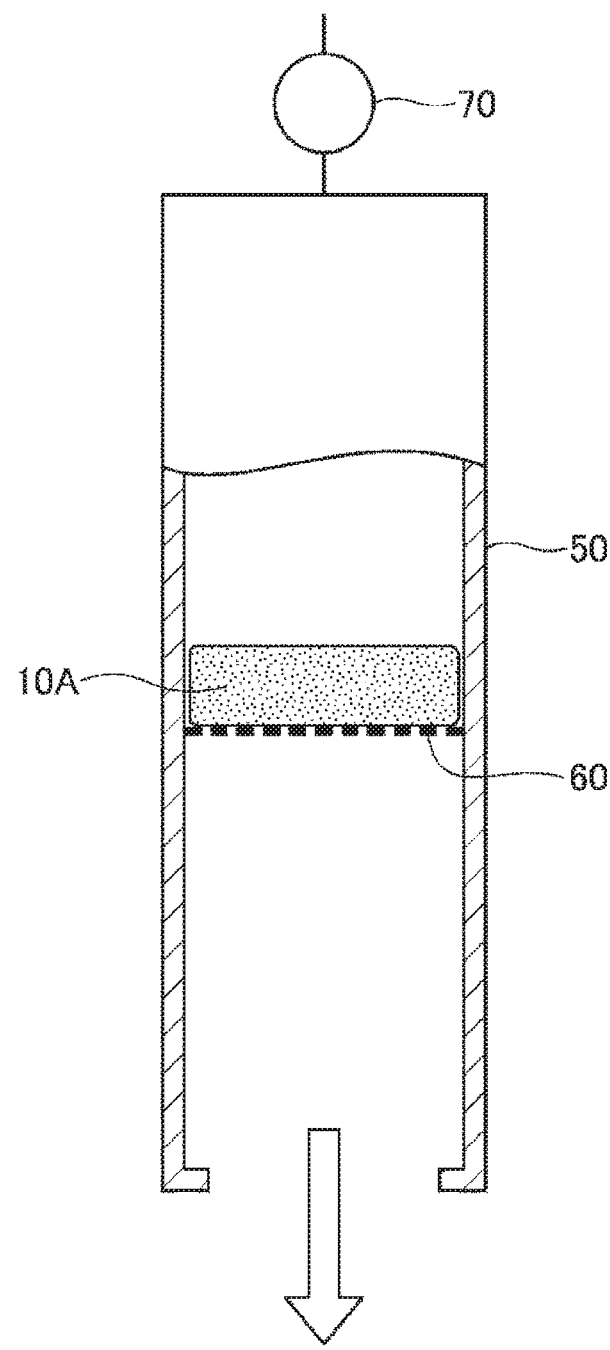
FIG. 11 is a schematic diagram describing a method of evaluating air permeability.

The wind speed as the above index of air permeability is obtained as follows. That is, as illustrated in FIG. 11, first, a mesh 60 is disposed in a pipe body 50 having an inner diameter of 60 mm, and the liquid absorbent body 10A of 2.57 g is evenly disposed thereon. The wind speed at the top of the pipe body 50 is measured by an anemometer 70 when suctioned by a blower (not illustrated) (vacuum cleaner CV-TN96 manufactured by Hitachi Industrial Equipment Systems Co., Ltd.) disposed below the pipe body 50.

For example, the evaporation rate of the pure water can be suitably adjusted according to conditions such as type, size and shape of the water absorbent resin, conditions of the pulp fiber such as length and aspect ratio of the pulp fiber, and various conditions such as the ratio of the water absorbent resin to the pulp fiber, the thickness of the fiber base material 2, the layer structure, the size and the shape of the small pieces 1. In addition, the evaporation rate of the pure water can be suitably adjusted by the conditions of a manufacturing method described later, for example, the conditions of cutting, crushing, and pulverizing the fiber base material 2.

Next, an example of a method of manufacturing the above-described liquid absorbent body 10A will be described.

The method of manufacturing the liquid absorbent body 10A includes a placement step, a heating and pressurizing step, and a shredding step.

First, as illustrated in FIG. 4, the placement step of placing the sheet shaped fiber base material 2 before being cut into the small piece 1 on a placement table 300 is performed.

A liquid containing water, for example, pure water, is applied to the sheet shaped fiber base material 2 from one surface side. Examples of the method of application include application by spray, a method in which the liquid containing water is soaked in a sponge roller, and the sponge roller is rolled on one surface of the sheet shaped fiber base material 2, and the like.

Next, as illustrated in FIG. 5, the water absorbent resin 3 is applied onto one surface of the sheet shaped fiber base material 2 through a mesh member 400. The mesh member 400 has a plurality of nets 401, the particles larger than the net 401 are captured on the mesh member 400 of the water absorbent resin 3, and the particles smaller than the net 401 pass through the net 401 and are applied onto one surface of the sheet shaped fiber base material 2. Here, the water absorbent resin 3 absorbs water to soften.

As described above, by using the mesh member 400, the particle diameter of the water absorbent resin 3 can be made as uniform as possible. Therefore, it is possible to more effectively prevent the occurrence of unevenness in the water absorbency by the location of the fiber base material 2.

The lower limit of the maximum width of the net 401 is preferably 0.06 mm, and more preferably 0.08 mm. The upper limit of the maximum width of the net 401 is preferably 0.15 mm, and more preferably 0.12 mm.

As a result, the particle diameter of the water absorbent resin 3 applied to the fiber base material 2 can be suitably adjusted to a value within the above range.

In addition, the shape of the net 401 is not particularly limited, and may be any shape such as a triangle, a quadrangle, a polygon of more than these, a circle, or an ellipse.

Next, as illustrated in FIG. 6, the sheet shaped fiber base material 2 to which the water absorbent resin 3 is attached is disposed between a pair of heating blocks 500. The pair of heating block 500 is heated and pressurized in a direction where the pair of heating block 500 approaches, and the heating and pressurizing step of pressurizing the fiber base material 2 in the thickness direction is performed. As a result, the water absorbent resin 3 which is softened by water absorption penetrates in the inner side of the fiber base material 2 by pressurizing, and is dried to be firmly carried on the fiber base material 2 as illustrated in FIG. 3.

The lower limit of the pressing force in this step is preferably 0.1 kg/cm$^2$, and more preferably 0.2 kg/cm$^2$. The upper limit of the pressing force in this step is preferably 1.0 kg/cm$^2$, and more preferably 0.8 kg/cm$^2$.

In addition, the lower limit of the heating temperature in this step is preferably 80° C., and more preferably 100° C. The upper limit of the heating temperature in this step is preferably 160° C., and more preferably 120° C.

The shredding step of shredding the sheet shaped fiber base material 2 on which the water absorbent resin 3 obtained as described above is carried is performed. The shredding step is performed by, for example, finely cutting, coarse crushing, crushing by scissors, a cutter, a mill, a shredder or the like, and by finely tearing by hand.

The liquid absorbent body 10A is used by being stored in a predetermined container, for example, by measuring a desired amount, and manual loosening.

The number of pieces of the small pieces 1 stored in the container is not particularly limited, and for example, the necessary number of pieces may be appropriately selected according to various conditions such as the use of the liquid absorbent body 10A. The maximum absorption amount of the liquid in the liquid absorbent body 10A is adjusted depending on the size of the storage amount of the small pieces 1.

In addition, the liquid absorbent body 10A may include a configuration other than the small piece 1. For example, pulp fibers as defibrated materials, a water absorbent resin not carried on the fiber base material 2, or a small piece of pulp fibers not carrying the water absorbent resin may be included. However, the content of the components other than the small pieces 1 in the liquid absorbent body is preferably 10% by mass or less, more preferably 5% by mass or less, and still more preferably 1% by mass or less.

1-2. Second Embodiment

FIG. 7 is a cross-sectional view of a small piece provided in a liquid absorbent body according to a second embodiment. FIG. 8 is a view illustrating a manufacturing step of manufacturing the liquid absorbent body according to the second embodiment, and illustrating a state where a sheet shaped fiber base material is bent after being applied with a water absorbent resin. FIG. 9 is a view illustrating a manufacturing step of manufacturing the liquid absorbent body according to the second embodiment, and illustrating a state where the sheet shaped fiber base material is heated and pressed.

Hereinafter, the second embodiment of the liquid absorbent body 10A will be described with reference to these drawings, differences from the above-described embodiment will be mainly described, and the same matters will not be described.

As illustrated in FIG. 7, in the present embodiment, the small piece 1 has two fiber base materials 2. The water absorbent resin 3 is provided between these fiber base materials 2. In other words, in the present embodiment, the small pieces 1 have a plurality of stacked fiber base materials 2, and the water absorbent resin 3 is provided between each of the fiber base materials 2.

As a result, the water absorbent resin 3 has a configuration in which each of the fiber base materials 2 is interposed and covered, and is prevented from being exposed to the outer surface of the small piece 1. As a result, the water absorbent resin 3 is more effectively prevented from detaching the fiber base material 2. Therefore, the high absorption characteristics of the liquid can be exhibited over a longer period of time, the water absorbent resin 3 can be more effectively prevented from being unevenly distributed in the container, and the occurrence of unevenness in the absorption characteristics of the liquid can be more effectively prevented.

In the illustrated configuration, although the small piece 1 has two fiber base materials 2 and the water absorbent resin 3 is disposed between these fiber base materials 2, for example, the small piece 1 may have three or more fiber base materials 2, and the water absorbent resin 3 may be disposed between these each of the fiber base materials 2.

Next, a method of manufacturing the liquid absorbent body 10A according to the present embodiment will be described.

The present manufacturing method has a placement step, a pinching step, a heating and pressurizing step, and a shredding step. The placement step, and the shredding step are the same as those in the above-described embodiment, and thus the description thereof will not be repeated.

As illustrated in FIG. 8, in the pinching step, the sheet shaped fiber base material 2 to which the water absorbent resin 3 is applied is bent in half, so that the fiber base material 2 covers both surface sides of the water absorbent resin 3 arranged in layers.

Next, as illustrated in FIG. 9, the folded sheet shaped fiber base material 2, in other words, a stacked body in which the fiber base material 2 is disposed on both surface sides of the water absorbent resin 3 arranged in layers, is placed between a pair of heating blocks 500. The pair of heating block 500 is heated and pressurized in a direction where the pair of heating block 500 approaches, and the heating and pressurizing step of pressurizing the fiber base material 2 in the thickness direction is performed. As a result, the water absorbent resin 3 which is softened by water absorption penetrates in the inner side of the fiber base material 2 by pressurizing, and is dried. In addition, at this time, drying is performed in a state where the water absorbent resins 3 which are bent and overlapped are joined.

According to such a manufacturing method, the fiber base material 2 can be stacked by a simple method of applying and bending the water absorbent resin 3 on one fiber base material 2. That is, an operation of respectively applying the water absorbent resin 3 to two fiber base material 2 can be omitted. Therefore, the manufacturing step can be simplified.

Furthermore, in the heating and pressurizing step, since the surface of the fiber base material 2 in contact with the heating block 500 is a surface to which the water absorbent resin 3 is not attached, it is possible to prevent the water absorbent resin 3 from adhering to the heating block 500. Therefore, a cleaning step of the heating block 500 can be omitted, and the productivity is excellent.

2. LIQUID ABSORBER AND LIQUID TREATMENT APPARATUS

Next, a liquid absorber provided with the liquid absorbent body of the present disclosure and a liquid treatment apparatus will be described. In the following description, an ink absorber as an example of the liquid absorber and a printing apparatus as an example of the liquid treatment apparatus will be described.

Figure 10:
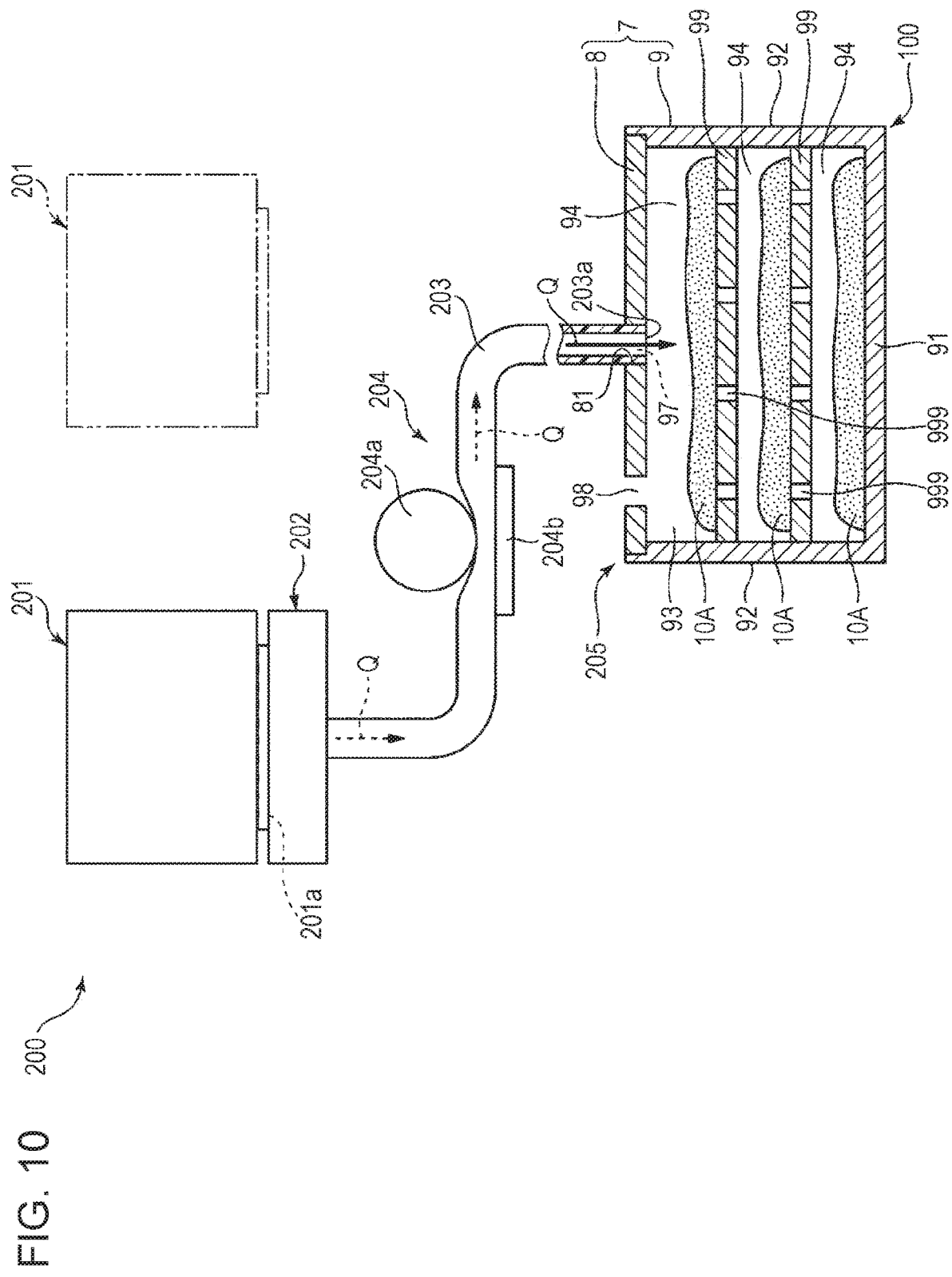
FIG. 10 is a partial vertical cross-sectional view illustrating an example of an ink absorber as a liquid absorber using the liquid absorbent body as an ink absorbent material, and an example of a printing apparatus as a liquid treatment apparatus.

FIG. 10 is a partial vertical cross-sectional view illustrating an example of an ink absorber as a liquid absorber using the liquid absorbent body as an ink absorbent material, and an example of a printing apparatus as a liquid treatment apparatus.

An ink absorber 100 as the liquid absorber illustrated in FIG. 10 is provided with the liquid absorbent body 10A as an ink absorbent material, a container main body 9 that stores the liquid absorbent body 10A, and a lid 8 that covers an upper opening of the container main body 9. The container 7 is configured to include the container main body 9 and the lid 8.

As a result, it is possible to obtain the ink absorber 100 capable of exerting the effects of the above-described liquid absorbent body 10A.

The liquid treatment apparatus according to the present disclosure is provided with the liquid absorber according to the present disclosure.

In particular, a printing apparatus 200 as the liquid treatment apparatus illustrated in FIG. 10 is, for example, an ink jet type color printer, is provided with a recovery portion 205 for recovering a waste liquid of the ink Q, and the ink absorber 100 as the liquid absorber of the present disclosure is provided in the recovery portion 205.

As a result, it is possible to obtain the printing apparatus 200 capable of exhibiting the effects of the ink absorber 100 described above.

In the present specification, "ink absorption" refers to absorbing the entire ink such as a solvent-based ink in which a binder is dissolved in a solvent, an UV curable ink in which a binder is dissolved in a liquid monomer which is cured by UV irradiation, and a latex ink in which a binder is dispersed in a dispersion medium, as well as absorbing an aqueous ink in which a coloring material is dissolved in an aqueous solvent. In particular, the present disclosure is preferably applied to an ink having a water content of 50% by mass or more.

The printing apparatus 200 includes an ink ejection head 201 ejecting the ink Q, a capping unit 202 preventing clogging of nozzles 201a of the ink ejection head 201, a tube 203 coupling the capping unit 202 and the ink absorber 100, a roller pump 204 transferring the ink Q from the capping unit 202, and the recovery portion 205.

The ink ejection head 201 has a plurality of nozzles 201a ejecting the ink Q downward. The ink ejection head 201 can eject the ink Q and perform printing while moving relative to a recording medium (not illustrated) such as a PPC sheet.

The capping unit 202 collectively sucks each of the nozzles 201a by the operation of the roller pump 204 when the ink ejection head 201 is in a standby position, and prevents clogging of the nozzles 201a.

The tube 203 is a tube passing the ink Q sucked through the capping unit 202 toward the ink absorber 100. The tube 203 is flexible.

The roller pump 204 is disposed in the middle of the tube 203, and includes a roller portion 204a and a pinching portion 204b which pinches the middle of the tube 203 between the pinching portion 204b and the roller portion 204a. The rotation of the roller portion 204a generates a suction force on the capping unit 202 through the tube 203. The roller portion 204a keeps rotating, so that the ink Q adhering to the nozzle 201a can be fed to the recovery portion 205.

The recovery portion 205 is provided with the ink absorber 100 storing the liquid absorbent body 10A used as the ink absorbent material. The ink Q passing through the tube 203 is sent to the ink absorber 100 and is absorbed as waste liquid by the liquid absorbent body 10A in the ink absorber 100. The ink Q contains ink of various colors.

As illustrated in FIG. 10, the ink absorber 100 is provided with the liquid absorbent body 10A, the container main body 9 that stores the liquid absorbent body 10A, and the lid 8 that covers an upper opening of the container main body 9. The container 7 is configured to include the container main body 9 and the lid 8.

The ink absorber 100 is detachably attached to the printing apparatus 200, and in the attached state, is used to absorb the waste liquid of the ink Q as described above. As described above, the ink absorber 100 can be used as a so-called "waste liquid tank". When the absorption amount of the ink Q of the ink absorber 100 reaches the limit, the ink absorber 100 can be replaced with a new ink absorber 100. A detection portion (not illustrated) in the printing apparatus 200 detects whether or not the absorption amount of the ink Q of the ink absorber 100 reaches the limit. In addition, when the absorption amount of the ink Q of the ink absorber 100 reaches the limit, that effect is notified by, for example, a notification portion such as a monitor incorporated in the printing apparatus 200.

The container 7 stores the liquid absorbent body 10A. The container main body 9 has a box shape including a bottom portion 91 formed of, for example, a bottom plate having a rectangular shape in plan view as viewed from above, and four side wall portions 92 erected upward from each side of the bottom portion 91. The liquid absorbent body 10A is stored in a predetermined portion in a storage space 93 surrounded by the bottom portion 91 and the four side wall portions 92. The lid 8 is a plate-shaped member that covers the upper opening of the container main body 9.

In particular, in the illustrated configuration, the container 7 includes an introduction port 97 into which the ink Q as a liquid to be absorbed by the liquid absorbent body 10A is introduced, and a vent hole 98. In the present embodiment, both the introduction port 97 and the vent hole 98 are formed in the lid 8.

Since the introduction port 97 is included, the ink Q can be introduced into the container 7 and absorbed by the liquid absorbent body 10A.

Since the vent hole 98 is included, when the ink Q is introduced into the container 7, the same volume of gas as the introduced ink Q out of the gas in the container 7 can be suitably discharged to the outside. As a result, the ink Q can be smoothly introduced into the container 7. In addition, since the vent hole 98 is included, the evaporation of the water from the ink Q absorbed by the liquid absorbent body 10A can proceed more suitably. Since the evaporation of the water from the ink Q absorbed by the liquid absorbent body 10A can proceed more suitably, it is also advantageous in further reducing the size of the ink absorber 100 and the printing apparatus 200, and further reducing the replacement frequency of the liquid absorbent body 10A.

At least one of the introduction port 97 and the vent hole 98 may be provided in a portion other than the lid 8, for example, in the side wall portion 92 of the container main body 9.

The vent hole 98 may be provided with a filter (not illustrated). This filter has water vapor permeability. By providing the filter, water vapor in the container 7 can be released to the outside of the container 7, and intrusion of foreign matter such as dust from the outside can be effectively prevented. In addition, it is possible to prevent the ink Q introduced into the container 7 from scattering from the vent hole 98 to the outside.

The container 7 has at least one, in particular, a plurality of partition portions 99 that partition the storage space in the container 7 into a plurality of spaces 93. The partition portion 99 has a plate shape, a sheet shape, a frame shape, and a net shape, and regulates the movement of the liquid absorbent body 10A between the spaces 94 in the container 7. The small pieces 1 are accommodated in the respective spaces 94 separated by the partition portions 99.

As a result, a gap portion can be efficiently formed between the small pieces 1 constituting the liquid absorbent body 10A in the container 7, and the absorption efficiency of the ink Q can be made more excellent. In addition, it is possible to effectively suppress a change in the amount of the small pieces 1 included in each space 94 in the container 7, and to effectively prevent the extreme uneven distribution of the liquid absorbent body 10A in the entire storage space 93. In addition, aggregation of the small pieces 1 can be suppressed. In general, when the small pieces 1 of the liquid absorbent body 10A absorb the liquid, the small pieces 1 tend to aggregate to reduce the volume, and the space between the small pieces 1 tends to decrease to reduce the air permeability. A plurality of partition portions 99 are provided so that a plurality of partitioned spaces 94 are provided in the depth direction of the storage space 93 in the container 7, particularly, the partition portions 99 extending in the horizontal direction are provided. Therefore, aggregation of the small pieces 1 can be suppressed, and the apparent bulk density can be increased. As a result, the air permeability is improved, and the evaporation of the liquid from the liquid absorbent body 10A can be promoted.

A communication hole 999 is formed in the partition portion 99. The communication holes 999 allow the vertically adjacent spaces 94 separated by the partition portion 99 to communicate with each other.

As a result, the ink Q can flow between the spaces 94 separated by the partition portion 99, and the absorption efficiency of the ink Q by the liquid absorbent body 10A can be made more excellent. In addition, the water vapor evaporated from the ink Q can move through the communication hole 999. As a result, a local increase in the vapor pressure in the container 7 can be prevented, and water vapor can be suitably discharged to the outside of the container 7 through the vent hole 98. As a result, the evaporation efficiency of water from the liquid absorbent body 10A can be made more excellent.

As such a partition portion 99, for example, a porous plate material or a mesh member can be used.

Examples of the shape of the communication hole 999 include a circular shape, an elliptical shape, a polygonal shape, and a slit shape.

The width of the communication hole 999 is not particularly limited, and is preferably smaller than the length of the small piece 1.

As a result, it is possible to more effectively prevent the small piece 1 from moving in the two spaces 94 separated by the partition portion 99 through the communication hole 999. As a result, the uneven distribution of the small pieces 1 in the container 7 can be more effectively prevented, and the absorption efficiency of the ink Q by the liquid absorbent body 10A and the evaporation efficiency of water from the liquid absorbent body 10A can be made more excellent.

The width of the communication hole 999 indicates the diameter when the communication hole 999 is circular, and indicates the length in the minor axis direction when the communication hole 999 has an elliptical shape, a polygonal shape, or a slit shaped.

The condition of the communication hole 999 may be the same or different at each portion of the partition portion 99. The condition of the communication hole 999 includes, for example, the size, shape, density, and the like of the communication hole 999.

As an example of a case where the condition of the communication hole 999 is different at each portion of the partition portion 99, when the partition portion 99 is viewed in plan view, the density of the communication holes 999 in the vicinity of the portion where the ink Q collides with the liquid absorbent body 10A is higher than the density of the communication holes 999 in other portions of the partition portion 99 may be used.

Each space 94 separated by the partition portion 99 is arranged along the vertical direction of the container 7.

With such a configuration, the ink Q supplied into the container 7 first comes into contact with the liquid absorbent body 10A accommodated in the uppermost space 94 and is absorbed by the liquid absorbent body 10A.

When there is the ink Q that is not absorbed by the liquid absorbent body 10A accommodated in the uppermost space 94 among the inks Q supplied into the container 7, the ink Q is supplied to the space 94 immediately below the uppermost space through the communication hole 999, that is, the space 94 at the second level from the top, comes into contact with the liquid absorbent body 10A accommodated in this space 94, and is absorbed by the liquid absorbent body 10A.

When there is the ink Q that is not absorbed by the liquid absorbent body 10A accommodated in the space 94 at the second level from the top among the inks Q supplied to the space 94 at the second level from the top, the ink Q is supplied to the space 94 immediately below the space at the second level from the top through the communication hole 999, that is, the space 94 at the third level from the top, comes into contact with the liquid absorbent body 10A accommodated in this space 94, and is absorbed by the liquid absorbent body 10A.

In this manner, the portion that is not absorbed in each space 94 among the ink Q supplied into the container 7 is sequentially supplied to adjacent different spaces 94, so that the overall absorption efficiency of the ink Q can be made more excellent.

In addition, the ink Q is normally colored, and a portion of the liquid absorbent body 10A that is in contact with the ink Q and a portion that is not in contact with the ink Q can be easily distinguished in appearance. In addition, it is normally easy to visually distinguish the portion of the liquid absorbent body 10A where the amount of contact with the ink Q is large from the portion where the amount of contact with the ink Q is small. As described above, for example, the cumulative absorption amount of the ink Q with respect to the small pieces 1, that is, the liquid absorbent body 10A accommodated in the respective spaces 94 of the container 7 can be easily determined in appearance. Therefore, for example, when the liquid absorbent body 10A accommodated in the container 7 is replaced, the liquid absorbent body 10A accommodated in the container 7 can be replaced collectively, and the replacement or replenishment of the small pieces 1, that is, the liquid absorbent bodies 10A, can be determined individually for each space 94. Therefore, it is preferable also from the viewpoint of suppressing the usage of the liquid absorbent body 10A.

The degree of coloring of the small piece 1, that is, the liquid absorbent body 10A by the ink Q can be confirmed by opening the container 7 even when the container 7 is opaque, and can be more easily confirmed when the container 7 is transparent having internal visibility, as described later.

In addition, in the illustrated configuration, two partition plates, which are plate-shaped partition portions 99, are provided, and when at least one partition portion 99 is provided, the above-described effect is exhibited. Only one partition portion 99 may be provided, or three or more partition portions 99 may be provided. In addition, in each space 94, there may be a space in which the liquid absorbent body 10A, that is, the small piece 1 is not stored.

The container main body 9 is not limited to the one having the bottom portion 91 having a square shape in plan view, may have, for example, the bottom portion 91 having a circular shape in plan view, and the whole may be cylindrical.

The container 7 is hard, in other words, has a shape-retaining property such that the volume does not change by 10% or more when an internal pressure or an external force acts on the container 7. As a result, the container 7 can maintain the shape of the container 7 itself even when each of the small pieces 1 of the liquid absorbent body 10A absorbs the ink Q, and thereafter expands to receive the force from the small piece 1 from the inside. Therefore, the installation state of the container 7 in the printing apparatus 200 is stabilized, and each of the small pieces 1 can stably absorb the ink Q.

The container 7, especially the container main body 9, may be made of a material that does not transmit the ink Q, and although the constituent material is not particularly limited, various resin materials such as cyclic polyolefin and polycarbonate can be used, for example. In addition, as the constituent material of the container 7, various metal materials such as aluminum and stainless steel can be used in addition to the various resin materials, for example.

In addition, the container 7, especially the container main body 9, may be transparent with internal visibility or opaque. Here, "transparent" is a concept including translucency, as long as it has visibility to the extent that an outline of the liquid absorbent body 10A inside the container 7, or a portion to which the ink Q of the liquid absorbent body 10A is attached can be identified.

As described above, the ink absorber 100 is provided with the lid 8 that covers the upper opening of the container main body 9. As illustrated in FIG. 10, the lid 8 has a plate shape and can be fitted to the container main body 9 in a liquid-tight manner.

A coupling port 81 to which the tube 203 is coupled is formed at a central portion of the lid 8. The coupling port 81 is configured to include a through-hole which penetrates the lid 8 in the thickness direction. The downstream end portion of the tube 203 can be inserted into and coupled to the coupling port 81 in a liquid-tight manner. In addition, at this time, a discharge port 203a of the tube 203 faces downward.

For example, radial ribs or grooves may be formed in the vicinity of the coupling port 81 on the lower surface of the lid 8. The rib or the groove can function as, for example, a regulation portion that regulates the flow direction of the ink Q in the container 7.

In addition, the lid 8 may have an absorbing property to absorb the ink Q, or may have a lyophobic property to repel the ink Q.

The lower limit of the thickness of the lid 8 is not particularly limited, and is, for example, preferably 1 mm, and more preferably 8 mm. In addition, the upper limit of the thickness of the lid 8 is not particularly limited, and is, for example, preferably 20 mm, and more preferably 10 mm. The lid 8 is not limited to a plate shape having such a numerical range, and may be a film-like one thinner than the plate shape. In this case, the thickness of the lid 8 is not particularly limited, and is preferably, for example, 10 mm or more and less than 1 mm.

The total number of pieces of the small pieces 1 stored in the container 7 is not particularly limited, and the necessary number may be appropriately selected according to various conditions such as the use of the ink absorber 100, for example. As described above, the ink absorber 100 has a simple configuration in which the required number of small pieces 1 is stored in the container 7. The maximum absorption amount of the ink Q in the ink absorber 100 is adjusted according to the size of the storage amount of the small pieces 1.

In addition, the amount of the small pieces 1 stored in each space 94 may be the same as or different from each other.

Hereinbefore, although the preferred embodiments of the present disclosure are described, the present disclosure is not limited to the above embodiments.

For example, the liquid absorbent body of the present disclosure may contain the water absorbent resin and the pulp fiber, the evaporation rate of pure water determined under predetermined conditions may be a value within a predetermined range, and may not need to be formed of an aggregate of small pieces as described above.

In addition, in the embodiments described above, although the case where the small pieces constituting the liquid absorbent body carry the water absorbent resin on the front surface of the fiber base material is described, the small pieces constituting the liquid absorbent body may uniformly contain the fibers and the water absorbent resin in each portion.

In addition, in the embodiments described above, at the time of manufacturing the liquid absorbent body, although the configuration of enhancing the adhesion between the fiber and the water absorbent resin is representatively described by going through a process of bringing the water absorbent resin into contact with a liquid containing water to soften the water absorbent resin, an adhesive may be used to bond the fiber and the water absorbent resin.

In addition, in the second embodiment described above, the case where the pinching step is performed by bending the sheet shaped fiber base material to which the water absorbent resin is applied in half is described, and for example, the pinching step may be performed by preparing two sheet shaped fiber base materials to which the water absorbent resin is applied, and causing these fiber base materials to face on the surface on which carries the water absorbent resin.

In addition, the liquid absorbent body according to the present disclosure is not limited to one manufactured by the method as described above.

In addition, in the embodiments described above, the ink absorber is typically described as an example of the liquid absorber, and the printing apparatus is typically described as an example of the liquid treatment apparatus, and the liquid absorber and the liquid treatment apparatus of the present disclosure are not limited to these. For example, the liquid absorber of the present disclosure may absorb liquid other than ink. In addition, the liquid treatment apparatus of the present disclosure may be, for example, various types of liquid application apparatuses such as spray type and dispense type, and liquid recovery apparatuses.

In addition, the liquid absorbent body of the present disclosure can be used, for example, as a liquid absorbent body in a waste liquid portion of a suction system for microbiology and cell culture.

In addition, the liquid absorbent body of the present disclosure can be used, for example, as an absorbent body for water or a water-soluble solution at the time of disaster or accident. The liquid absorbent body of the present disclosure absorbs a large amount of liquid, and can be discarded by suitably drying to reduce the weight when discarded. In addition, although disposal in a solution state requires enormous treatment and a large environmental load, treatment as a solid can be performed by applying the liquid absorbent body of the present disclosure.

In addition, in the embodiment described above, a case is described in which the plurality of spaces separated by the partition portion are arranged along the vertical direction of the container, and the arrangement of each space is not limited thereto. For example, the plurality of spaces separated by the partition portion may be disposed in different portions in the horizontal plane direction.

In addition, the container may not have the above-described partition portion.

EXAMPLE

Next, specific examples of the present disclosure will be described.

In the following description, a treatment which does not indicate the temperature condition and the humidity condition is performed under the environment of a temperature of 25° C. and a relative humidity of 35%. In addition, various measurements are performed at a temperature of 25° C. and a relative humidity of 35% when the temperature condition and the humidity condition are not indicated.

3. PREPARATION OF LIQUID ABSORBENT BODY

Example 1

First, A4 size PPC sheet G80 manufactured by Toppan Forms Co., LTD. was prepared as a sheet shaped fiber base material containing pulp fibers. The weight of this PPC sheet was 4 g/sheet.

Next, 2 g of pure water was applied to the PPC sheet from one surface side by spraying on the entire surface of the PPC sheet.

Next, ST-500 MPSA (manufactured by Sanyo Chemical Industries, Ltd.) as a polyacrylic acid polymer crosslinked product, which is a water absorbent resin having a carboxyl group as an acid group in a side chain, was applied from the surface side applied with pure water of the PPC sheet. At this time, the water absorbent resin was applied while passing through a sieve (JTS-200-45-106 manufactured by Tokyo Screen Co., Ltd.) having a net having an opening size of 0.106 mm. The application amount of the water absorbent resin per one PPC sheet was 3 g.

The waste paper was folded in half so that a valley was formed on the surface to which the water absorbent resin adhered. In this folded state, the sheet shaped fiber base material was pressurized and heated in the thickness direction using a pair of heating blocks as illustrated in FIG. 6. The pressurizing was performed at 0.3 kg/cm², and the heating temperature was 100° C. In addition, the heating and pressurizing time was 120 seconds.

The heating and pressurizing were released, the fiber base material left at room temperature for 12 hours. When the sheet shaped fiber base material was at room temperature, the sheet shaped fiber base material was cut into a strip having a width of 2 mm and a length of 15 mm using a shredder with a basic shred size of 2 mm×15 mm (SeCuret series F3143SP manufactured by Ishizawa Seisakusho Co., Ltd.) to obtain a plurality of small pieces of aggregate.

The content of the water absorbent resin in the small pieces was 75% by mass with respect to the pulp fibers, and the average particle diameter of the water absorbent resin was 35 to 50 µm. In addition, in each of the small pieces, the water absorbent resin was impregnated into the fiber base material.

By cutting into small pieces with the multi-cut shredder in this manner, a liquid absorbent body deformed into an indeterminate shape due to a difference in shear force at the time of cutting or stress strain in the material piece was prepared.

Example 2

A liquid absorbent body was prepared in the same manner as in Example 1 except that the type of shredder was changed and the size of the small pieces was changed to 2 mm in width and 3 mm in length.

Example 3

First, A4 size PPC sheet G80 manufactured by Toppan Forms Co., LTD. was prepared as a sheet shaped fiber base material containing pulp fibers. The weight of this PPC sheet was 4 g/sheet.

This PPC sheet was subjected to a defibration treatment to obtain a cotton-like defibrated material. The defibration treatment was performed using a turbo mill T250 manufactured by Freund Turbo Corporation. The defibrated material obtained in this manner was an aggregate of fibers having an average length of 700 µm and an average width of 20 µm.

Next, 75 parts by mass of ST-500 MPSA (manufactured by Sanyo Chemical Industries, Ltd.) as a polyacrylic acid polymer crosslinked product, which is a water absorbent resin having a carboxyl group as an acid group in a side chain, was applied to 100 parts by mass of the defibrated material. At this time, the water absorbent resin was applied while passing through a sieve (JTS-200-45-106 manufactured by Tokyo Screen Co., Ltd.) having a net having an opening size of 0.106 mm.

Thereafter, the mixture was put into a plastic bag, and vibration was applied with an amplitude of 100 mm and a frequency of 3 Hz for 30 seconds to mix the mixture to prepare a liquid absorbent body. That is, the liquid absorbent body of present Example does not contain the small pieces.

Example 4

A liquid absorbent body was prepared by mixing the liquid absorbent body of Example 1 and the liquid absorbent body of Example 2 at a mass ratio of 50:50.

Example 5

A liquid absorbent body was prepared in the same manner as in Example 1 except that the amount of the water absorbent resin applied per PPC sheet was changed to 1 g.

Comparative Example 1

A liquid absorbent body was prepared in the same manner as in Example 1 except that a small piece was cut into a disk shape having a diameter of 25 mm with scissors without using a shredder.

Comparative Example 2

A liquid absorbent body was prepared in the same manner as in Example 1 except that a small piece was cut into a disc shape having a diameter of 60 mm with scissors without using a shredder.

Comparative Example 3

In the present comparative example, a humidifying filter for an evaporative humidifier (FE-ZGE05, manufactured by Panasonic Corporation) cut into a disk shape of 2.57 g per piece was used as a liquid absorbent body.

The liquid absorbent body obtained in each of the above Examples and Comparative Examples had a water content of less than 5.0% by mass.

In addition, for the liquid absorbent body of each of the above Examples and Comparative Examples, the evaporation rate of pure water when pure water was absorbed was determined as follows. That is, first, a liquid absorbent body of 2.57 g, and pure water of 20 mL are put into a New Dispo cup (manufactured by AS ONE Corporation), which is a polypropylene container having a container opening area of 0.0028 m², an average container inner diameter of 60 mm, and a capacity of 200 mL, and vibrated by an AS200 digit, electromagnetic sieve shaker manufactured by Retsch GmbH, under the condition of amplitude of 2.4 mm×1 minute. Thereafter, the container containing the liquid absorbent body and the pure water was allowed to stand for 360 minutes in a constant temperature and humidity chamber (PL-3KPH, manufactured by Espec Corporation) under constant operating conditions adjusted to 60° C. and 20% RH. Thereafter, the mass of the container immediately after the vibration and the mass after standing for 360 minutes were compared, and the evaporation amount of pure water was determined from the mass loss amount. The evaporation rate of pure water was calculated from the determined evaporation amount.

4. EVALUATION 4-1. Air Permeability before Liquid Absorption

As described below, the air permeability of the liquid absorbent body of each of the above Examples and Comparative Examples before ink absorption was evaluated.

That is, as illustrated in FIG. 11, the mesh 60 was disposed in the pipe body 50 having an inner diameter of 60 mm, and the liquid absorbent body 10A of 2.57 g was evenly disposed thereon. The wind speed at the top of the pipe body 50 was measured by an anemometer 70 when suctioned by a blower (not illustrated) (vacuum cleaner CV-TN96 manufactured by Hitachi Industrial Equipment Systems Co., Ltd.) disposed below the pipe body 50.

It can be said that the higher the wind speed, the better the air permeability.

4-2. Ink Absorption Characteristics

As described below, the ink absorption characteristics of the liquid absorbent body of each of the above Examples and Comparative Examples were evaluated.

First, 1.75 g of a liquid absorbent body is accommodated in a New Dispo cup (manufactured by AS ONE Corporation) which is a polypropylene container having a capacity of 100 mL, and 25 mL of mixed ink in which BK (RDH-BK), C (RDH-C), M (RDH-M) and Y (RDH-Y) manufactured by Seiko Epson Corporation, which are commercially available ink jet inks, were mixed at a mass ratio of 3:1:1:1 and having a specific gravity of 1.05 was dropped over 15 seconds. After the dropping, the container was left tightly closed so that water did not evaporate.

Thirty minutes after the completion of the ink dropping, the container was turned upside down by 180°, and the unabsorbed amount of the leaked ink was measured and evaluated according to the following criteria. It can be said that the greater the ink absorption amount, the better the absorption characteristics of the liquid. B and above were regarded as good levels.
A: Ink unabsorbed amount is less than 1 mL.
B: Ink unabsorbed amount is 1 mL or more and less than 5 mL.
C: Ink unabsorbed amount is 5 mL or more and less than 10 mL.
D: Ink unabsorbed amount is 10 mL or more.

4-3. Air Permeability after Liquid Absorption

The liquid absorbent body of each of the above Examples and Comparative Examples used for obtaining the evaporation rate of the pure water as described above was further subjected to stand for 10 hours under an environment adjusted to 60° C., 20% RH using constant temperature and humidity chamber.

Thereafter, the air permeability of these liquid absorbent bodies was evaluated by the same method as described in 4. Air Permeability before Liquid Absorption.

4-4. Ink Evaporation Amount

As described below, the ink evaporation amount of the liquid absorbent body of each of the above Examples and Comparative Examples was evaluated.

First, 100 g of the liquid absorbent body was put into a polypropylene waste liquid box having an inner dimension of 80 mm in width, 120 mm in depth, and 60 mm in height.

Thereafter, it was vibrated by an AS200 digit electromagnetic sieve shaker manufactured by Retsch GmbH under the condition of an amplitude of 2.4 mm×1 minute.

Next, 250 mL of mixed ink in which BK (RDH-BK), C (RDH-C), M (RDH-M) and Y (RDH-Y) manufactured by Seiko Epson Corporation, which are commercially available ink jet inks, were mixed at a mass ratio of 3:1:1:1 and having a specific gravity of 1.05 was dropped over 150 seconds. After dropping, the ink was allowed to stand at 23° C. and 50% RH, and the ink evaporation amount after 10 days was measured and evaluated according to the following criteria. It can be said to be advantageous that the greater the amount of ink evaporation, the greater the lifetime absorption amount of the liquid. B and above were regarded as good levels.
A: Ink evaporation amount is 15 mL or more.
B: Ink evaporation amount is 10 mL or more and less than 15 mL.
C: Ink evaporation amount is 5 mL or more and less than 10 mL.
D: Ink evaporation amount is less than 5 mL.

4-5. Precipitation of Ink Solid Content

As described below, for the liquid absorbent body of each of the above Examples and Comparative Examples, the precipitation of the ink solid content after applying the ink was evaluated.

First, 100 g of the liquid absorbent body was put into a polypropylene waste liquid box having an inner dimension of 80 mm in width, 120 mm in depth, and 60 mm in height.

Thereafter, it was vibrated by an AS200 digit electromagnetic sieve shaker manufactured by Retsch GmbH under the condition of an amplitude of 2.4 mm×1 minute.

Next, 1 mL of mixed ink in which BK (RDH-BK), C (RDH-C), M (RDH-M) and Y (RDH-Y) manufactured by Seiko Epson Corporation, which are commercially available ink jet inks, were mixed at a mass ratio of 3:1:1:1 was dropped with a pipette. After dropping the mixed ink, the mixture was allowed to stand at 23° C. and 50% RH, and the dropping of 1 mL of the mixed ink was repeated every hour. When the total drop amount of the mixed ink reached 250 mL, an accumulation height of the ink solid content at the ink drop position on the surface of the liquid absorbent body was measured and evaluated according to the following criteria. It can be said to be advantageous that the lower the accumulation height of the ink solid content is, the greater the lifetime absorption amount of the liquid. B and above were regarded as good levels.
A: Accumulation height of ink solid content is less than 1 mm.
B: Accumulation height of ink solid content is 1 mm or more and less than 3.
C: Accumulation height of ink solid content is 3 mm or more and less than 6 mm.
D: Accumulation height of ink solid content is 6 mm or more.

Table 1 indicates these results together with the evaporation rate of the pure water for each liquid absorbent body.

TABLE 1

| | Evaluation | | | | | |
|---|---|---|---|---|---|---|
| | Evaporation rate of pure water [g/(cm² · min)] | Air permeability before liquid absorption [m/s] | Ink absorption characteristics | Air permeability after liquid absorption [m/s] | Ink evaporation amount | Precipitation of ink solid content |
| Example 1 | 0.0014 | 21 | B | 20 | A | A |
| Example 2 | 0.0012 | 19 | A | 18 | A | A |
| Example 3 | 0.0007 | 10 | A | 9 | B | A |
| Example 4 | 0.0013 | 20 | A | 19 | A | A |
| Example 5 | 0.0012 | 19 | B | 18 | A | A |
| Comparative Example 1 | 0.0005 | 7 | C | 6.5 | C | C |
| Comparative Example 2 | 0.0004 | 1 | D | 0.9 | D | D |
| Comparative Example 3 | 0.0025 | 22 | B | 22 | A | C |

As is apparent from Table 1, in the present disclosure, since the initial liquid absorption capacity is high, and it is possible to suitably evaporate the water in the ink while suppressing the precipitation amount of the solid content of the ink on the surface, so that it was suggested that the lifetime absorption amount of liquid was high. Above all, in Examples 1 and 2, particularly good results were obtained. It was found that this was because the liquid absorbent body was an aggregate of small pieces in which the fiber base material containing the pulp fiber carried the water absorbent resin, so that the surface area can be increased, the ink absorption characteristics can be particularly excellent, a ventilation path was easily secured by making it difficult to aggregate, and the evaporation characteristics were improved. On the other hand, in Comparative Examples, satisfactory results were not obtained.

In addition, when the same evaluation as described above was performed, except that BCI-381sBK, an ink jet ink manufactured by Canon Inc., LC3111BK, an ink jet ink manufactured by Brother Industries, Ltd., and HP 61XL CH563WA, an ink jet ink manufactured by Hewlett-Packard Company were used instead of the mixed ink of ink jet ink manufactured by Seiko Epson Corporation used above, the same result as described above was obtained.

In addition, when the same evaluation as described above was performed except that the volume and shape of the container, and ink application amount were variously changed, the same results as described above were obtained.

In addition, when the liquid absorbent body was prepared in the same manner as in the above Examples, and the same evaluation as described above was performed except that the ratio of the content of the water absorbent resin was changed in the range of 25% by mass or more and 300% by mass or less with respect to the content of the pulp fibers in the small pieces, the same results as described above were obtained.

In addition, when the same evaluations as described above were performed for the above Examples and Comparative Examples, except that the container having the configuration illustrated in FIG. 10 was used, the same results as described above were obtained.

In addition, when a printing apparatus as illustrated in FIG. 10 including these containers was prepared, and for these containers, the ink sucked from the ink ejection head by the capping unit was supplied into the container of the ink absorber for a long time, in each of the above Examples, the ink was appropriately absorbed, whereas in each of the above Comparative Examples, the presence of the ink not absorbed by the liquid absorbent body was confirmed.

What is claimed is:

1. A liquid absorbent body comprising:
a water absorbent resin and a pulp fiber, wherein
an evaporation rate of a pure water until elapse of 360 minutes after the pure water is absorbed is 0.0006 g/(cm$^2$·min) or more and 0.0020 g/(cm$^2$·min) or less, when the pure water of 20 mL is absorbed into the liquid absorbent body of 2.57 g, under an environment of 60° C. and 20% RH.

2. The liquid absorbent body according to claim 1, wherein
the liquid absorbent body is configured to include an aggregate of small pieces in which a fiber base material containing the pulp fiber carries the water absorbent resin.

3. The liquid absorbent body according to claim 1, wherein
the small piece includes a plurality of the fiber base materials that are stacked, and
the water absorbent resin is provided between each of the fiber base materials.

4. A liquid absorber comprising:
the liquid absorbent body according to claim 1; and
a container that accommodates the liquid absorbent body.

5. The liquid absorber according to claim 4, wherein
the container includes an introduction port into which a liquid to be absorbed by the liquid absorbent body is introduced, and a vent hole.

6. The liquid absorber according to claim 4, wherein
the liquid absorbent body is configured to include an aggregate of small pieces in which a fiber base material containing the pulp fiber carries the water absorbent resin,
the container includes at least one partition portion that regulates movement of the liquid absorbent body in the container, and
the small pieces are accommodated in a plurality of spaces separated by the partition portion.

7. A liquid treatment apparatus comprising:
the liquid absorber according to claim 4.

* * * * *